May 22, 1923.
L. C. BONIFACINO ET AL
TIRE ARMOR
Filed March 20, 1922
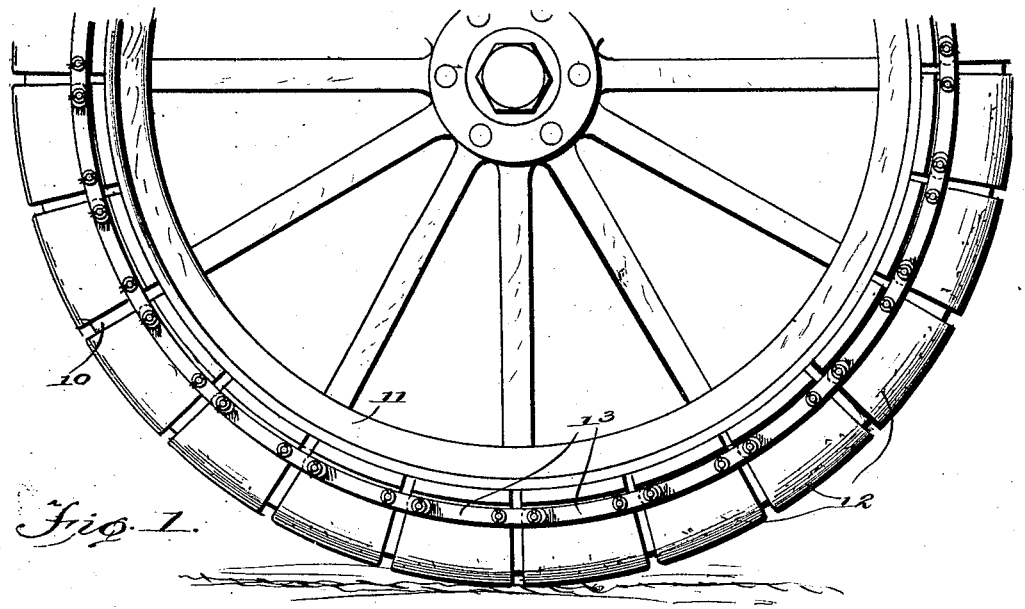
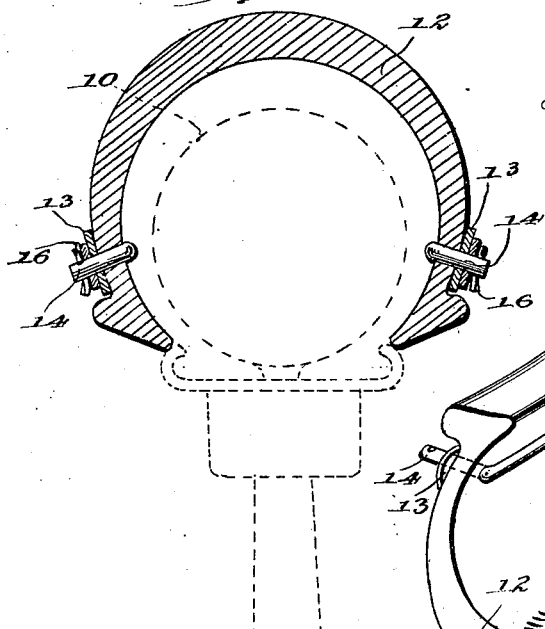
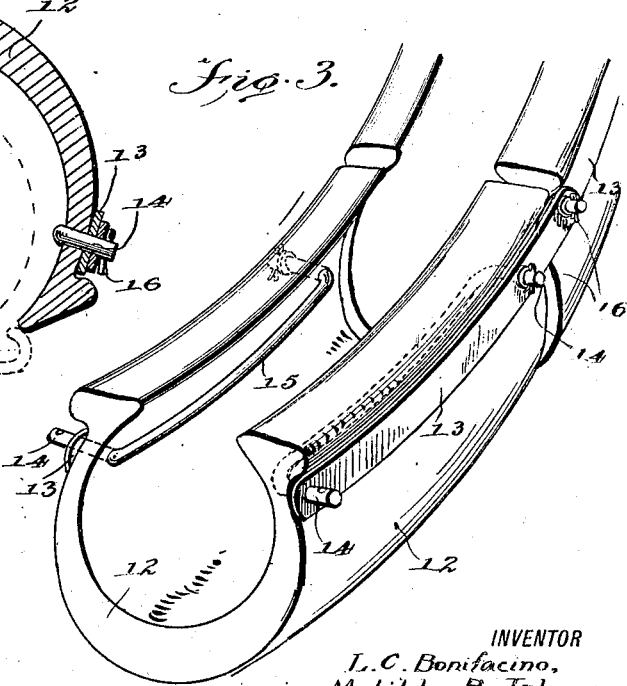
WITNESSES
INVENTOR
L. C. Bonifacino,
Matilda B. Irby,
BY
ATTORNEYS Patented May 22, 1923.

1,456,421

UNITED STATES PATENT OFFICE.

LAWRENCE C. BONIFACINO AND MATILDA B. IRBY, OF BALTIMORE, MARYLAND.

TIRE ARMOR.

Application filed March 20, 1922. Serial No. 545,121.

*To all whom it may concern:*

Be it known that we, LAWRENCE C. BONIFACINO and MATILDA B. IRBY, citizens of the United States, and residents of Baltimore, in the State of Maryland, have invented certain new and useful Improvements in Tire Armors, of which the following is a specification.

Our present invention relates generally to tire armors and more particularly to protectors for pneumatic tires, our object being the provision of a simple inexpensive construction whereby sections of old outer casings or shoes may be coupled together in segments to form a tire protecting tread adapted to sustain wear in use and of such nature as to permit of ready substitution of different sections of the protector where this becomes necessary on account of wear or breaks.

In the accompanying drawing which illustrates our present invention and forms a part of this specification, Figure 1 is a partial side view of a pneumatic tired wheel illustrating the practical application of our invention, Figure 2 is a radial section through the protector, and Figure 3 is a detail perspective view of certain portions of the protector.

Referring now to these figures our invention proposes an armor or external tread protector for pneumatic tires such for instance as indicated at 10 in connection with a wheel generally seen at 11 in Figure 1, the said protector or armor consisting of a circumferential series of endwise adjacent segmental sections 12 which it is contemplated will be cut from discarded outer casings or shoes, to fit around shoes of lesser diameter so as to not only cover the periphery but the side walls as well of the tire to be protected as will be clearly seen by reference to Figure 2. These sections are connected by virtue of side rings, each consisting of curved metal straps 13 at opposite sides of each section 12, each strap being extended at one end to overlap the adjacent end of the next strap 13 at one side thereof.

In order to connect the straps 13 to the sections 12 in such manner that the latter may be readily removed and other sections substituted in case of wear or breakage of the parts, the end portions of each section 12 at opposite sides thereof are pierced by the outwardly projecting end portions 14 of U-shaped connecting bars 15, these bars extending along the inner surfaces of the side walls of the segmental protector sections 12 so as to strengthen and brace the latter.

The outwardly projecting extensions 14 thus form attaching studs, for the reception of which the straps 13 are apertured at their extremities and also at points adjacent to and spaced from one end so that these straps thus not only receive the studs 14 of one of the protector sections 12, but one apertured end extends beyond the respective end of each section for connection with the adjacent stud of the next section of the protector and overlaps the adjacent end of the strap of the last mentioned section.

The studs 14 themselves are preferably apertured adjacent to their outer ends to receive cotter pins and like fastening members 16, which avoid accidental lateral displacement of the straps and thus maintain the latter in position forming side rings completely around the protector, the straps forming the several sections of which rings are pivotally connected in endwise overlapping relation without necessitating straps in greater number than the necessary pair of straps for each segmental section 12 of the protector itself.

It is obvious that this construction not only provides a protector or armor which is simple and inexpensive in the first instance, but also one in which provision is made to readily detach any particular section or sections whose removal becomes necessary on account of wear or breakage, and the quick substitution of new sections.

We claim:

1. A tire protector or armor consisting of a circumferential series of segmental protector sections to embrace the periphery of a tire, side rings connecting the protector sections in the circumferential series and each including a series of endwise overlapping and pivotally connected straps one strap to each of the protector sections, and means for connecting each strap to its respective protector section, said means including bars extending along the inner surfaces of the side walls of the protector sections, having outturned end extensions projecting through the side walls of the protector sections, the said strap sections having apertures to receive said extensions.

2. A tire protector or armor consisting of a circumferential series of segmental protector sections to embrace the periphery of a tire, side rings connecting the protector sections in the circumferential series and each including a series of endwise overlapping and pivotally connected straps one strap to each of the protector sections, and means for connecting each strap to its respective protector section, said means including bars extending along the inner surfaces of the side walls of the protector sections, having outturned end extensions projecting through the side walls of the protector sections, the said strap sections having apertures to receive said extensions and said extensions having apertures and cotter pins through the apertures of the extensions to hold the strap sections in place.

LAWRENCE C. BONIFACINO.
MATILDA B. IRBY.